(12) United States Patent
Kruck et al.

(10) Patent No.: US 9,298,539 B1
(45) Date of Patent: Mar. 29, 2016

(54) AUTOMATED ERROR RECOVERY FOR WORKFLOWS

(71) Applicant: Symantec Corporation, Mountain View, CA (US)

(72) Inventors: Joshua David Kruck, St. Paul, MN (US); Shyam Prakash Velupula, Deshaipet (IN)

(73) Assignee: Veritas US IP Holdings LLC, Mountain View, CA (US)

( * ) Notice: Subject to any disclaimer, the term of this patent is extended or adjusted under 35 U.S.C. 154(b) by 189 days.

(21) Appl. No.: 13/645,980

(22) Filed: Oct. 5, 2012

(51) Int. Cl.
*G06F 11/07* (2006.01)
*G06F 11/30* (2006.01)

(52) U.S. Cl.
CPC .......... *G06F 11/0793* (2013.01); *G06F 11/302* (2013.01)

(58) Field of Classification Search
CPC .................................................... G06F 11/0793
USPC ............................................................ 714/48
See application file for complete search history.

(56) References Cited

U.S. PATENT DOCUMENTS

| | | | | |
|---|---|---|---|---|
| 5,799,297 | A * | 8/1998 | Goodridge et al. | |
| 6,202,067 | B1 * | 3/2001 | Blood et al. | 707/613 |
| 6,918,053 | B1 * | 7/2005 | Thatte et al. | 714/16 |
| 7,062,679 | B2 * | 6/2006 | Yoshii et al. | 714/38.14 |
| 7,840,857 | B2 * | 11/2010 | Breiter et al. | 714/48 |
| 7,904,756 | B2 * | 3/2011 | Dilman et al. | 714/38.1 |
| 8,078,914 | B2 * | 12/2011 | Leeb et al. | 714/26 |
| 2006/0233312 | A1 * | 10/2006 | Adams et al. | 379/21 |
| 2006/0265201 | A1 * | 11/2006 | Martin | 703/6 |
| 2010/0011256 | A1 * | 1/2010 | Nakajima | 714/48 |
| 2011/0032562 | A1 * | 2/2011 | McCuen et al. | 358/1.15 |
| 2011/0185315 | A1 * | 7/2011 | Armour et al. | 715/853 |

OTHER PUBLICATIONS

Why use BPEL. BPEL XML.org. Dec. 14, 2007 [Retrieved on: Jun. 6, 2014]. Retrieved from the Internet: <URL: http://bpel.xml.org/why-use-bpel>.*
Microsoft Corporation, Microsoft Computer Dictionary, 2002, Microsoft Press, Fifth Edition, p. 518.*

* cited by examiner

*Primary Examiner* — Albert Decady
*Assistant Examiner* — Paul Contino
(74) *Attorney, Agent, or Firm* — Campbell Stephenson LLP

(57) ABSTRACT

Various systems and methods for automated error recovery in workflows. For example, one method involves executing operations of a first task. A workflow includes multiple tasks that include the first task. Each of the tasks represents one or more operations that are configured to access one or more elements. The method also involves detecting an error in execution of the one or more first operations, where the error indicates inaccessible elements. In response to the error detection, the method can automatically execute an error recovery portion of the first task. Execution of the error recovery portion includes receiving one or more responses, where the first task can use the response(s) instead of the one or more inaccessible elements.

20 Claims, 10 Drawing Sheets

AUTOMATED ERROR RECOVERY FOR WORKFLOWS

FIELD OF THE INVENTION

This application relates to workflows. More particularly, this application relates to performing automated error recovery when executing workflows.

BACKGROUND OF THE INVENTION

Workflow is a term that can describe tasks, procedural steps, organizations or people involved, input and output information, and tools, for use by a process. A workflow can be used, for example, to simulate and/or represent one or more processes. Workflow processes can be used to streamline processes that can involve both manual and automatic operations. For example, a workflow process can be defined for accessing or provisioning of storage resources. Various types of tasks can be performed within a workflow. These tasks can be implemented by local services, remote Web services, scripts, sub-workflows, etc. Typically, each task can be configured to implement a small part of functionality, and thus the tasks can be linked together, such as to indicate control flow between the tasks.

Typically, workflows can be generated using workflow designer software. A workflow designer software can be used to combine process analysis management with an object-oriented programming approach. Workflow designer software can include, for example, a graphical user interface (GUI) for composing workflows. Workflow software can also include a runtime engine for executing workflows within the GUI. For example, a workflow can be generated to define what storage resources can be requested, who can request storage resources, and so on. Another workflow process can search for and obtain various data, such as configuration data, or other data. Workflows can perform various routines and subroutines, and can be configured to process data entry in such a way that it runs in the background, allowing a user to concentrate on other tasks.

BRIEF DESCRIPTION OF THE DRAWINGS

The embodiments of the present application may be better understood, and its numerous objects, features, and advantages made apparent to those skilled in the art by referencing the accompanying drawings.

Figure 1:
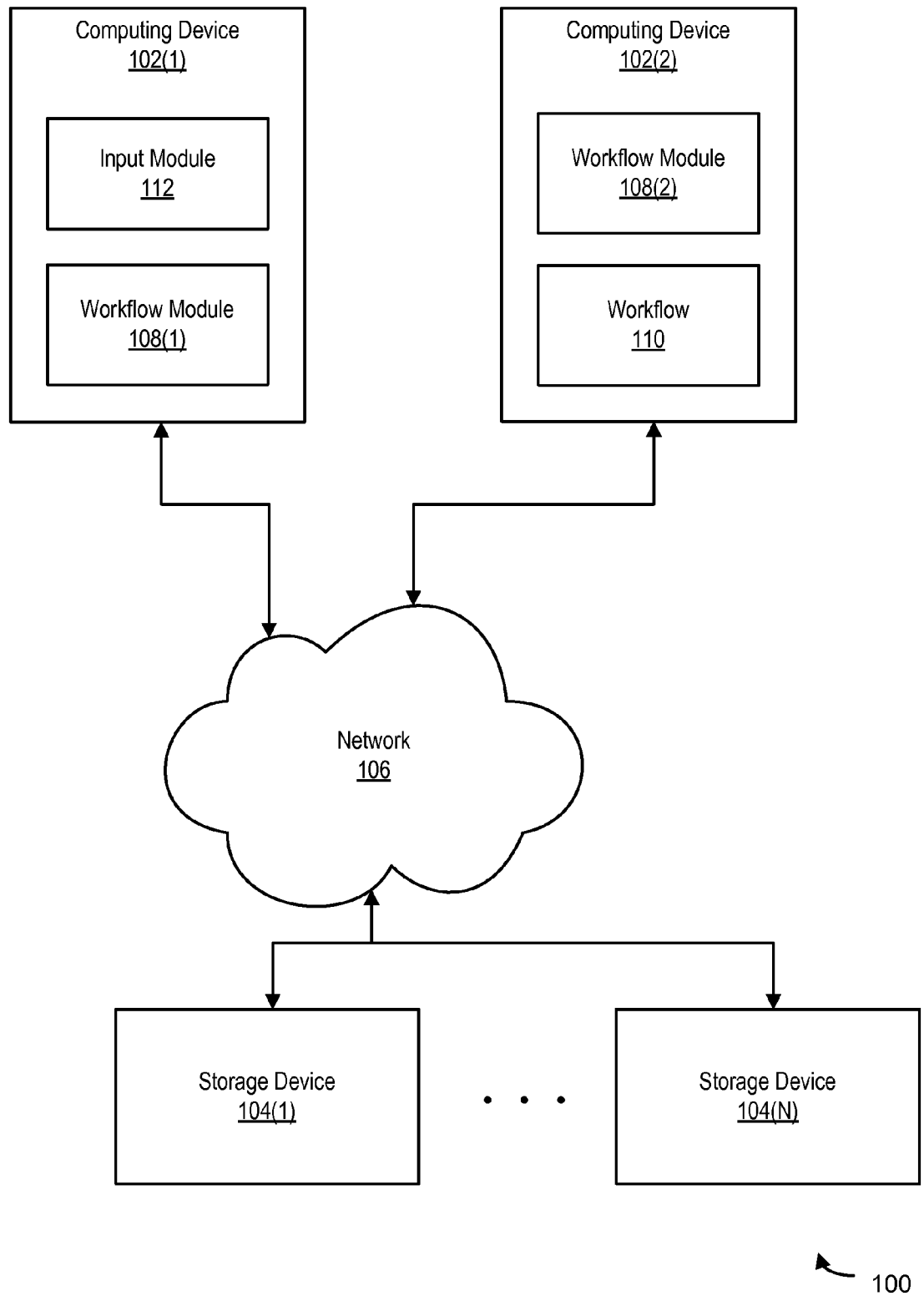
FIG. 1 is a block diagram illustrating a system that implements a workflow process for handling requests for storage devices, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

FIG. 1 is a block diagram 100 of a system that implements a workflow processes, such as used in distributed storage systems, according to some embodiments. As shown, the system includes several computing devices 102(1) and 102(2), which are coupled to various storage resources 104 using one or more networks 106. Network 106 can include a WAN (Wide Area Network), such as the Internet, one or more LANs (Local Area Networks), and/or one or more SANs (Storage Area Networks). The workflow processes can be implemented using a workflow 110, such as can be generated and/or executed by workflow module 108(1)-108(2).

Computing devices 102(1) and 102(2) (collectively also referred to as computing devices 102) are examples of devices such as workstations, personal computers, servers, PDAs (Personal Digital Assistants), cell phones, network switches, storage array controllers, and the like. Computing devices 102(1) and 102(2) are used by users (e.g., administrators and/or consumers) to interact with a workflow process and/or storage resources 104(1)-104(N) (collectively also referred to as storage resources 104). It is noted that users (such as administrators and/or consumers) can include people, other computing devices, and/or applications (such as software applications).

Consumers can include individuals, groups of people, or applications that use one or more storage resources 110. Administrators can include individuals or groups of people that configure storage resources 110 for use by consumers and/or control which storage resources 110 are provided to which consumers. Administrators can represent administrators both within the same organization as the consumers and in different organizations. For example, one administrator can be a system administrator, network administrator, and/or a budget manager within the same organization as a consumer. Another administrator can be a system and/or network administrator within another organization, which provides storage services to the first organization.

In this example, computing device 102(1) can be used by a consumer of storage resources 104. The consumer can be a person using computing device 102(1) or an application executing on computing device 102(1). The consumer can generate a workflow 110 that accesses storage device 104. Workflow 110 can include various tasks, such as for obtaining information on various computer systems, for creating configuration files, and/or for performing some backup tasks, among others. During execution of such workflow 110 (e.g., by workflow module 108(1)-108(2)), execution of one of the tasks can fail. Upon this task failure, workflow module 108

(1)-108(2) can automatically execute an error recovery portion of that task. By using the task's error recovery portion, workflow 110 does not need to include (e.g., a workflow designer does not need to generate/design) additional tasks and/or code to perform such error recovery. Instead, any such error recovery is included in that task. For example, each task can include its own error recovery functionality, e.g., by including error handlers and/or linking to error handlers. As a result, the workflow does not need to handle each possible error condition, as error handler(s) that handle various error conditions are programmed into the task itself. Therefore, design of such workflows is simplified.

In one implementation, such error recovery can use an input module 112. For example, during error recovery, workflow module 108(1)-108(2) can communicate with input module 112, such as to prompt a user with one or more questions related to the failure of the task of workflow 110. Input module 112 can then receive one or more inputs (e.g., user inputs). In another implementation, the error recovery can include the workflow module(s) and/or input module(s) automatically accessing one or more additional sources of data, such as data repositories, databases, and/or the World Wide Web (WWW), among others. For example, the workflow module(s) and/or input module(s) can obtain one or more inputs from the additional source(s) of data. In yet another implementation, the workflow module(s) and/or input module(s) can first attempt to obtain the input(s) from one location (e.g., using input module 112), and if that is unsuccessful/incomplete, attempt to obtain the input(s) from the additional source(s) of data. Depending on the implementation, the input(s) can then be used by workflow module 108(1)-108(2), such as to re-execute the failed task, or to execute the next task in the workflow.

In one embodiment, computing device 102(1) can be used by a user (e.g., a workflow designer) who can generate (e.g., by using some workflow designer software) a workflow to use/access storage device(s) 104(1)-104(N). An instance of workflow module 108(1) can be implemented on the user's computing device 102(1), allowing a user to interact (e.g., using input module 112) with workflow module 108(1) in order to generate or modify workflow 110. In one implementation, input module 112 can communicate with workflow module 108(2) (e.g., directly and/or using workflow module 108(1)) to generate workflow 110.

In another embodiment, the workflow can be generated and/or executed using computing device 102(1), e.g., without using computing device 102(2). In one embodiment, computing device 102(2) can be used by an administrator who controls the use of storage device(s) 104(1)-104(N) via the workflow process. An instance of workflow module 108(2) can be implemented on the administrator's computing device 102(2), allowing the administrator to interact with the workflow process in order to generate or modify workflow 110. Workflow module 108(2) can also provide an interface via which the administrator can view the current configuration of storage resources being used by consumers as well as the current sets of unused storage resources and reserved storage resources.

Storage devices 104(1)-104(N) represent various physical and logical storage resources available to consumers within the system. These storage devices can include storage resources that are co-located with (also referred to as local to) consumers (e.g., such storage resources can be part of and/or directly coupled to the consumer's computing device) and/or storage resources that are located remotely from the consumers (e.g., such storage resources can be part of a data center, accessible to the consumers via a Wide Area Network (WAN) such as the Internet). Examples of storage devices can include disk drives, Compact Disc (CD) drives, Digital Versatile Disc (DVD) drives, tape drives, hard drives, and/or the like, and can be arranged using any number of technologies, such as using storage arrays (e.g., a Redundant Array of Independent Disks (RAID). Furthermore, storage devices 104 can be accessed using logical objects, such as subdisks, plexes, and/or volumes, among others. Workflow 110 can include tasks that access various logical objects, such as to access data and/or to perform various backup functions.

Workflow module 108(1)-108(2) can be distributed among two or more computing devices (such as one workflow module (e.g., 108(1)) for workflow generation and another workflow module (e.g., 108(2)) for workflow execution), but other implementations are contemplated. In one embodiment, only one such workflow module is used, i.e., a workflow module can be implemented on the same computing device as input module 112. Workflow module 108(1)-108(2) provides a mechanism via which designers and/or administrators can generate (and/or execute) workflows.

Figure 2:
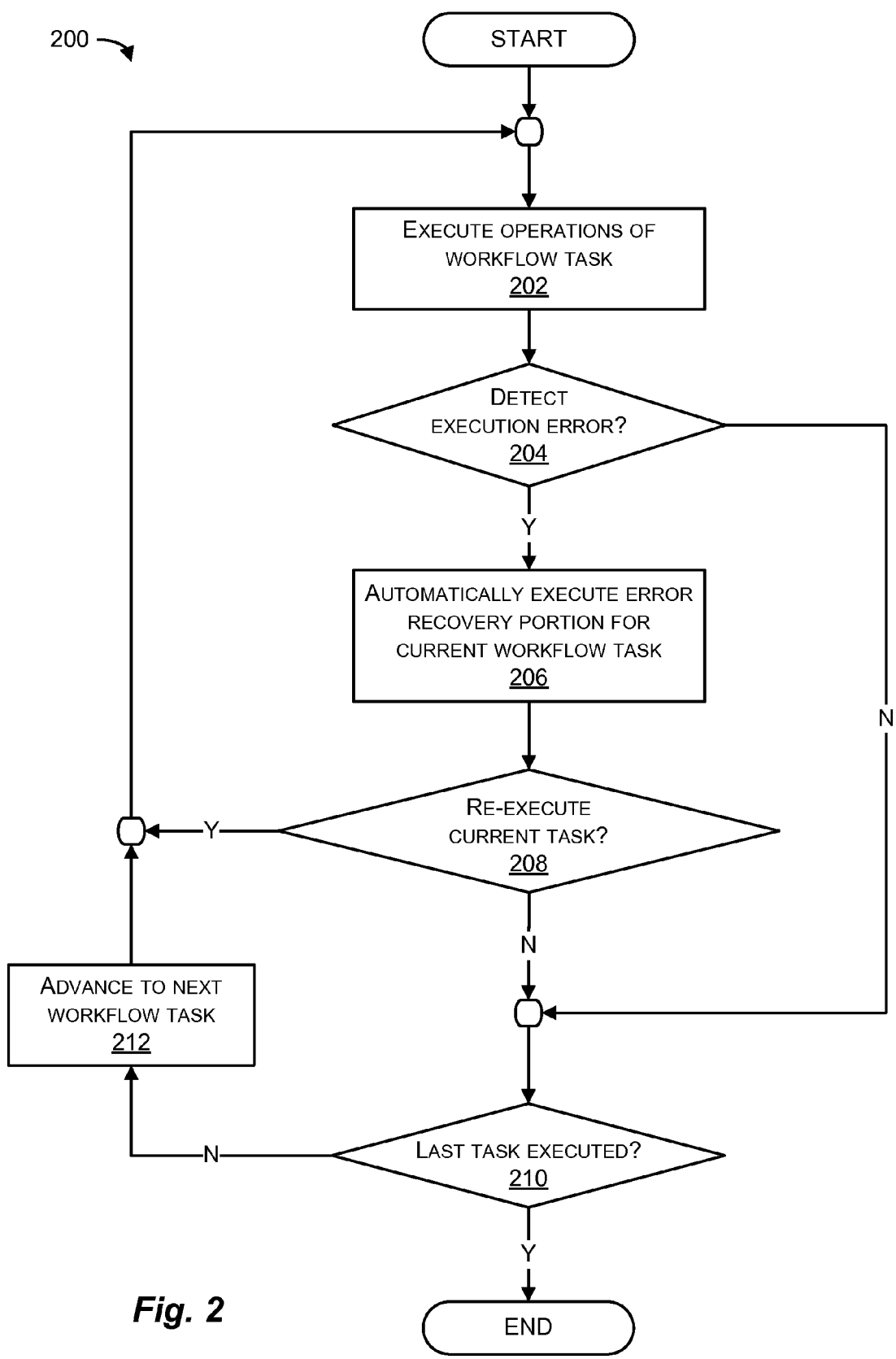
FIG. 2 is a flowchart illustrating a method for automated error recovery in workflow processes, according to one embodiment.

FIG. 2 is a flowchart illustrating a method 200 for automated error recovery in workflow processes, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 200 is described with reference to variations of the elements described in connection with FIG. 1, as well as with reference to some elements of FIG. 6. In one embodiment, method 200 can be executed on computing device 102(1)-102(2), such as by workflow module 108(1) and/or 108(2).

In element 202, one or more operations of a task of a workflow are executed, according to one embodiment. For example, a workflow module (such as workflow module 108(1)-108(2)) can execute a first task in a workflow (e.g., workflow 110). The workflow can contain multiple tasks, such as illustrated with reference to FIG. 6. Each such task can include one or more operations. An example task can include operation(s) of obtaining names of computing devices, such as of system of FIG. 1; it is noted that actual implementations can vary, and this example is described for ease of explanation. In some implementations, the workflow module executes tasks of a workflow according to control flow principles. Once a task successfully executes, then the next task is executed, as indicated by the workflow. The workflow can be generated using one of visual programming languages and/or a textual language.

Figure 6:
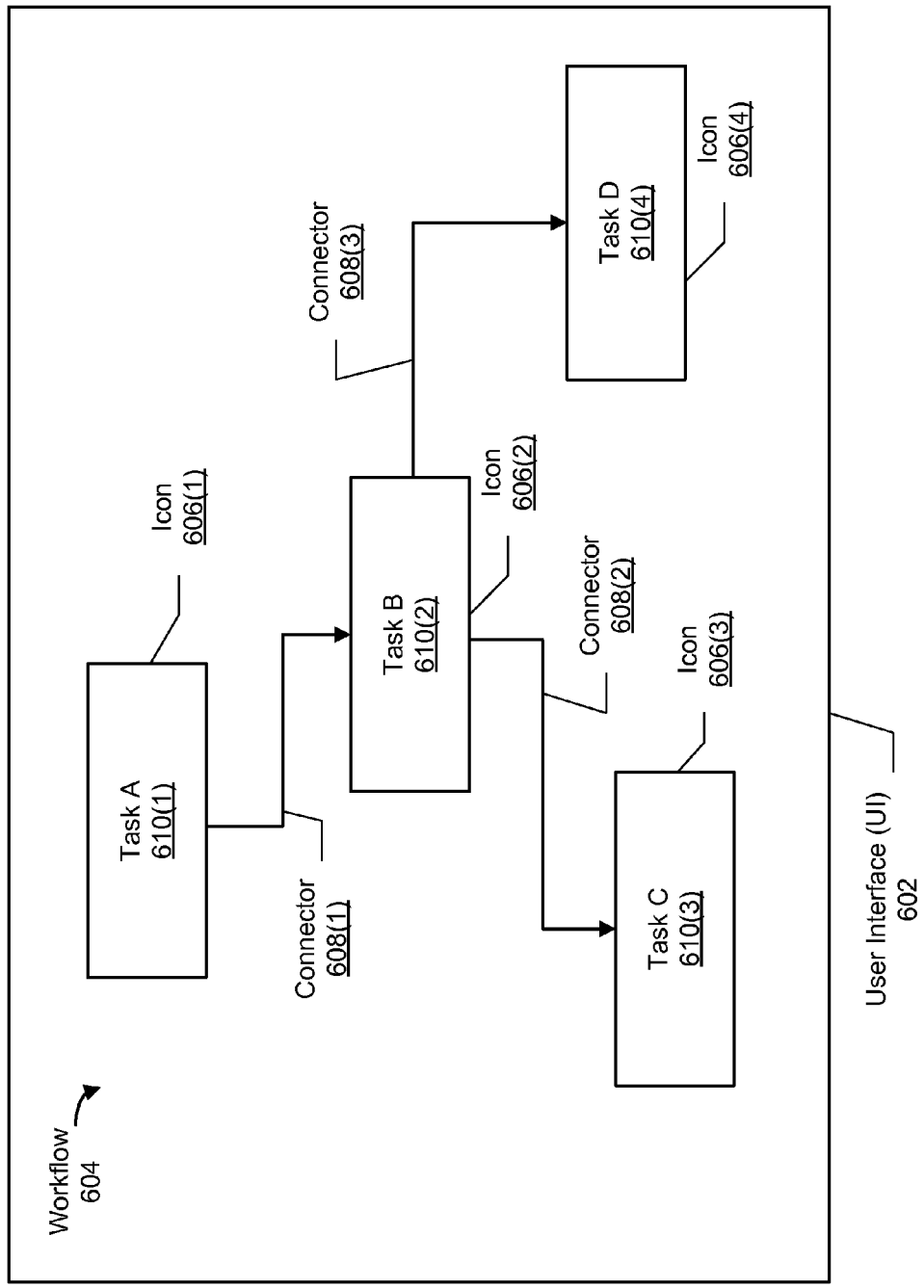
FIG. 6 illustrates example user interface for displaying a workflow, according to some embodiments.

To illustrate operation of method 200, FIG. 6 is referenced for ease of explanation. Although FIG. 6 shows a visual language representation of a workflow, a textual workflow program with tasks A-D can be used instead. FIG. 6 illustrates an example workflow 602 with workflow tasks 604(1)-604(4). Workflow tasks are connected using connectors 606(1)-606(3), where each connector indicates control flow of workflow. Thus, connector 606(1) indicates that task A 604(1) is to be executed first, followed by task B 604(2). Each of tasks A-D is a visual representation of one or more operations. For example, task A can be a visual representation of operation(s) of obtaining names of computing devices. Similarly, task B can be a visual representation of a next task that attempts to store the obtained names in one or more databases. In one implementation, during workflow execution, the workflow module first executes the operations represented by Task A.

In element 204, a determination is made as to whether there's an error in execution of the operation(s) of the task, according to one embodiment. For example, the workflow module can detect whether there is an error in execution of the operation(s) of the task. With reference to the above example, the workflow module determines whether one of the operations of the tasks has failed. In one embodiment, the error determination is performed by the task(s) being executed. With reference to FIG. 6, in one embodiment, the workflow module detects an error when executing operations that are represented by Task A. Such determination can be a result of the workflow module detecting such an execution error. In another embodiment, the operation(s) of Task A that are being executed can detect such error(s). Depending on the implementation, task A can communicate with the workflow module regarding the detected error, such as to have the workflow module communicate with the input module.

In one example, the workflow module (and/or the executing task) can detect that an operation fails when attempting to obtain a name of a mobile device that is connected to the network (e.g., network 106 of FIG. 1). If the workflow module (and/or the executing task) determines that there's an execution error, element 206 is performed next. If the workflow module (and/or the executing task) determines that there's no execution error, element 210 is performed next. In one embodiment, the workflow module (and/or the executing task) can indicate an execution error for some workflow execution errors, but not for other execution errors. For example, the workflow module (and/or the executing task) can indicate an execution error when a certain task operation fails, but indicate no error when another task operation fails.

In element 206, an error recovery portion is automatically executed for the current workflow task, according to one embodiment. For example, the workflow module (and/or the executing task) executes an error recovery portion that is associated with the failed workflow task. One implementation of such an error recovery portion is described below with reference to FIG. 4. With reference to FIG. 6, this task recovery portion is represented by Task A, i.e., no further visual (and/or textual) programming is needed by designer of workflow 602 to implement this error recovery portion. In one embodiment, the error recovery portion can be executed as part of Task A's execution. As part of Task A's error recovery, communication can be sent to the workflow module, e.g., to inform the workflow module of the error(s).

In element 208, a determination is made as to whether the current task should be re-executed, according to one embodiment. For example, the workflow module can determine, such as based on execution of element 206, whether to re-execute the failed workflow task. In one implementation, once the error recovery portion is executed (e.g., by Task A as part of element 206), then the workflow module (e.g., upon receiving communication from Task A regarding the error(s)), performs this determination. If the workflow module determines that the current task should be re-executed, element 202 is performed next. In other embodiments, the failed task can make this determination.

If the current task should be re-executed, then in element 202 the failed task (or at least the operation that failed in that task) is re-executed. If the workflow module (and/or the task) determines that the current task should not be re-executed, element 210 is performed. With reference to FIG. 6, if the current task should be re-executed, then task A is executed again (such as by using the workflow module).

In element 210, a determination is made as to whether a last task of the workflow is executed, according to one embodiment. For example, the workflow module determines whether there are any additional workflow tasks that should be executed. If the workflow module determines that there are additional workflow tasks that should be executed, element 212 is performed next. In element 212, the workflow module can advance to the next workflow task that is to be executed in the workflow, according to one embodiment. For example, when element 202 is performed again, the workflow module would execute the next workflow task in the workflow. With reference to FIG. 6, the workflow module would execute task B (which is the next workflow task in workflow 602). Otherwise, if the workflow module determines that there are no more additional workflow tasks that should be executed, method 200 ends.

Figure 3:
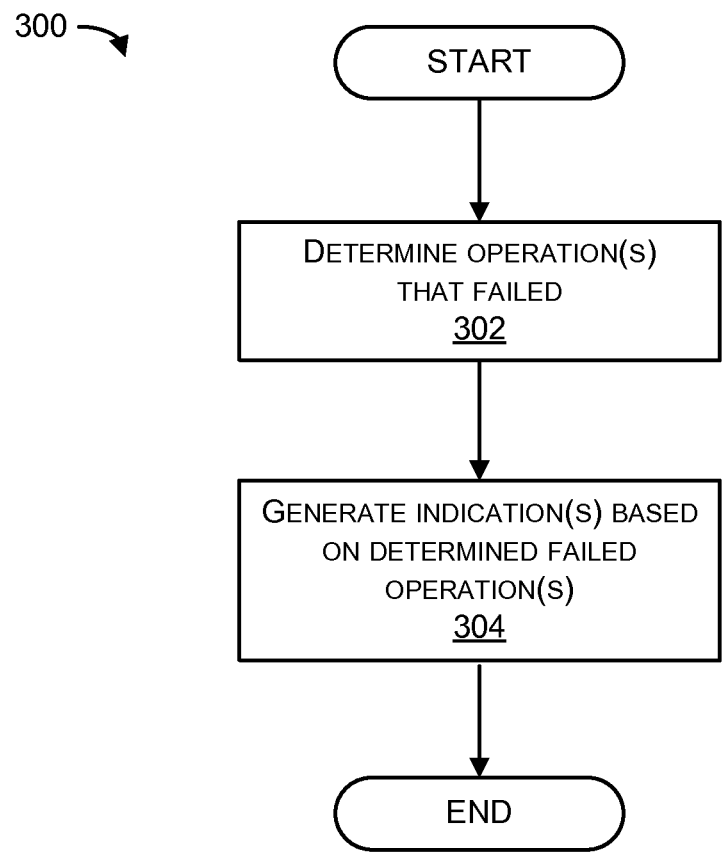
FIG. 3 is a flowchart illustrating additional elements of a method for automated error recovery in workflow processes, according to one embodiment.

FIG. 3 is a flowchart illustrating a method 300 for automated error recovery in workflow processes, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 300 is described with reference to variations of the elements described in connection with FIG. 1. In one embodiment, method 300 can be executed on computing device 102(1)-102(2), such as by workflow module 108(1) and/or 108(2). In some embodiments, method 300 can be performed as part of one or more elements of method 200 of FIG. 2, such as element 202.

In element 302, one or more operations of a failed task are determined, according to one embodiment. For example, the workflow module (and/or the executing task) can determine which operations (e.g., that represent a task being executed) have failed. With reference to FIG. 6, the workflow module (and/or the executing task) can determine which operations of task A have failed.

In element 304, one or more indications of determined failed operations are generated, according to one embodiment. For example, the workflow module (and/or the executing task) generates an indication (e.g., such as a notification, flag, and/or a variable) that indicate the failed operation(s). This indication can simply indicate the failed operation, or the indication can include additional information, such as metadata, on this failed operation. This additional information can be used by the error recovery portion. These indications can be used by the workflow module, such as when performing element 204 of method 200.

Figure 4:
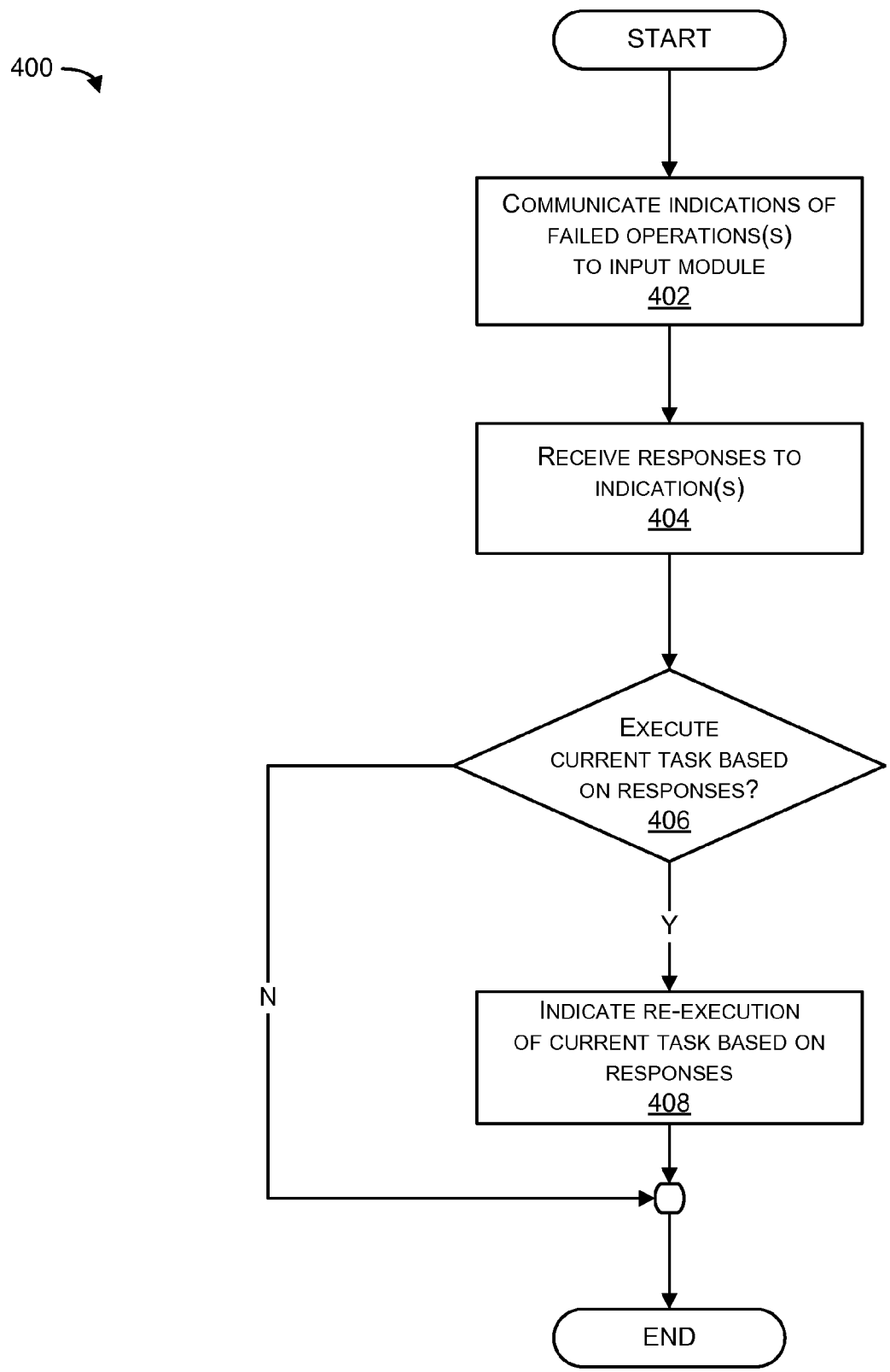
FIG. 4 is a flowchart illustrating additional elements of a method for automated error recovery in workflow processes, according to one embodiment.

FIG. 4 is a flowchart illustrating a method 400 for automated error recovery in workflow processes, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 400 is described with reference to variations of the elements described in connection with FIG. 1. In one embodiment, method 400 can be executed on computing device 102(1)-102(2), such as by workflow module 108(1) and/or 108(2). In some embodiments, method 400 can be performed as part of one or more elements of method 200 of FIG. 2, such as element 206.

In element 402, one or more indications of failed operation(s) are communicated to an input module, according to one embodiment. For example, the workflow module can communicate failure indication(s) to an input module, such as input module 112. In one embodiment, each such failure indication can indicate workflow task(s) and/or operation(s) that have failed. In another embodiment, such failure indication(s) can include prompts that can be used to display (e.g., to a user) to obtain data elements that were not obtained by the failed task/operation(s) (e.g., inaccessible element(s)). In yet another embodiment, such failure indication(s) can specify which error handling operations are to be performed by the input module.

In element 404, one or more responses are received, according to one embodiment. For example, the response(s) can be received by the workflow module from the input module. In one embodiment, each such response can include response element(s). These response elements can be used by the workflow task(s) and/or operation(s) that have failed. For example, a response can include a computer name of a mobile device, which can later be used by the workflow module, such as to re-execute the failed task. In one embodiment, in element 404, the workflow module can also receive null response(s) and/or time out, such as when no response(s) are received during a certain time period. This time period can be generated prior to execution of the workflow. The time period can also be dynamically determined, such as based on various characteristics of the system that is accessed by the workflow and/or the workflow itself. Such characteristics can include, for example, processing speed of the system, network bandwidth, and/or time sensitivity of the currently executing workflow, among others.

In element 406, a determination is made as to whether to execute the current task based on the response, according to one embodiment. For example, the workflow module can determine (e.g., based on the received response(s)) whether to re-execute the failed workflow task. If the workflow module determines that the current task should be re-executed, element 408 is performed next. For example, if the current task should be re-executed, an indication (e.g., such as a notification, flag, and/or a variable) of re-execution can be generated (element 408). This re-execution indication can then be used, for example, by element 208 of method 200. The re-execution indication can also include and/or indicate the responses. Otherwise, if the workflow module determines that the current task should not be re-executed, method 400 ends.

Figure 5:
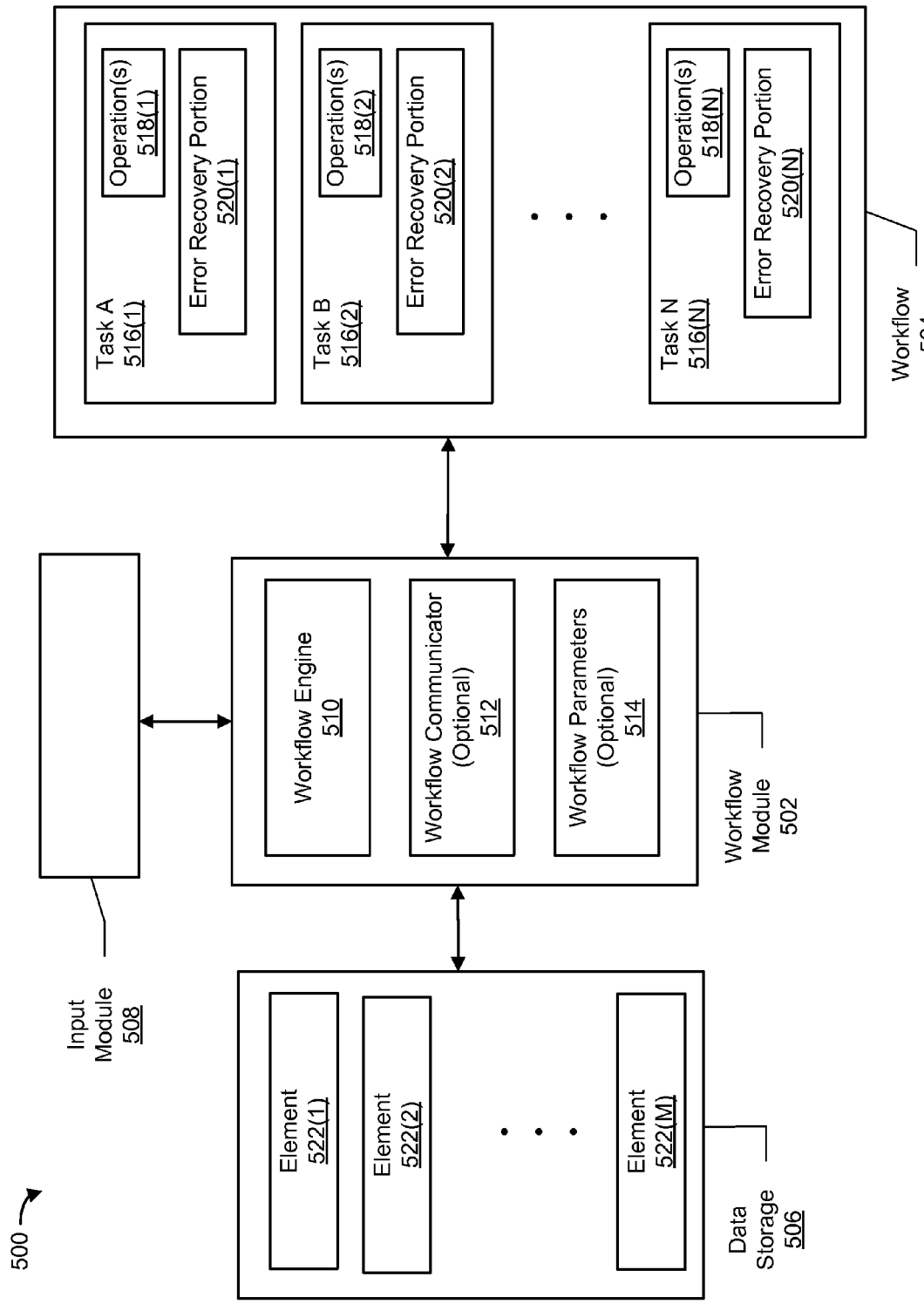
FIG. 5 is a block diagram illustrating elements of a system that implements a workflow process for handling requests for storage devices, according to one embodiment.

FIG. 5 is a block diagram 500 illustrating elements of a system that implements a workflow process for handling requests for storage devices, according to one or more embodiments. It is noted that is some embodiments, one or more of these elements may be combined. It is also noted that one or more of modules shown in block diagram 500 may be implemented as a software and/or hardware modules. It is also noted that in some embodiments, one or more of elements of shown in block diagram 500 may not be used. Furthermore, one or more elements and/or operations shown in block diagram 500 can be performed at one or more computing devices.

In some embodiments, a workflow module 502 executes tasks of a workflow 504, such as to access elements of data storage 506. Upon failure of one of tasks of workflow 504, workflow module can execute an error recovery portion of that failed task. The error recovery portion can access an input module 508, such as to communicate indications of a failed task (e.g., failed operations of that task). Workflow module 502 can then receive responses from input module 508.

In one embodiment, workflow module 502 includes a workflow engine 510 and a workflow communicator 512, and can access optional workflow parameters 514. Workflow engine 510 (e.g., a workflow service) can execute workflow 504, as described below. Workflow communicator 512 (e.g., a messaging service) can communicate with input module 508, as described below. Workflow parameters 514 can include various parameters related to location and/or execution of each workflow, and/or location of data storage and/or data elements. Depending on implementation, workflow engine 510 can direct execution of various tasks, include a compiler and/or interpreter to execute such tasks, or may not be used altogether. Upon receipt of information from input module 508, workflow engine can determine whether to re-execute the failed task, or to execute the next task in workflow 504 (e.g., as indicated by the workflow, including according to control flow principles). In some embodiments, workflow engine 510 can be implemented using a workflow service, such by using a separate thread. Furthermore, execution of each task of workflow 504 can be executed using a separate thread, such as when such tasks are being executed in parallel. In some embodiments, workflow communicator 512 can be implemented using a messaging service that can generate messages, such as described below. Furthermore, workflow communicator can be executed by using a separate thread (e.g., separate from the thread executing workflow engine 510).

In one embodiment, workflow 504 includes one or more tasks, such as tasks 516(1)-516(N). Each such task includes one or more operations 518(1) and one or more error recovery portions 520(1). Similarly, other tasks 518(2)-518(N) include operation(s) 518(1)-518(N) and error recovery portion(s) 520(N), respectively. Depending on implementation, each task 516(1)-516(N) can include high level source code, intermediate code, low level code, machine code, binary code, interpreted code, script code, and/or executable code, among others. Each task is configured to be executed. Depending on implementation, task execution can be accomplished by using workflow engine that includes an interpreter, compiler, a visual language engine, and/or scheduler, among others. In one embodiment, one or more of tasks 516(1)-516(N) can be visually represented, such as using visual task icons that are used by GUI of a visual workflow software (e.g., as shown in FIG. 6).

Each error recovery portion 520(1)-520(N) can be executed (e.g., by workflow module 502, such as by using workflow engine 510) upon a failure of a respective task. Thus, if one of operations 518(1) of task A 516(1) fails, then error recovery portion 520(1) is executed. In one embodiment, each error recovery portion can include one or more error handlers which can be executed. It is noted that although input module can include error handler(s) in addition to, or instead of, the error recovery portion. For example, error handlers of error recovery portion can be executed (e.g., by workflow module) to determine specifics of the failed operation(s), such as what data elements were not properly obtained by the failed operation(s) (e.g., inaccessible elements). These determined operations (and/or indication of the missing data element(s)) can then be communicated to input module 508.

In one embodiment, data storage 506 includes one or more data elements 522(1)-522(M). It is noted that each such data element can be of different type. Also, data elements 522(1)-522(M) can be distributed across multiple data storage units, such as over a network. For example, with reference to FIG. 1, data storage 506 can be implemented across storage devices 104(1)-104(N), the World Wide Web (WWW), and computing devices 102(1)-102(2), among others. Data storage 506 can include various types of data, such as databases, configuration data (e.g., of computing devices), user data, metadata, and/or network characteristics, among others. With relation to various examples given above, data elements 522(1)-522(M) can be elements that some task operation(s) are configured to obtain. Furthermore, if a certain task operation fails to obtain a data element, such as data element 522(2), then the error recovery portion of the failed task can communicate with input module 508 to obtain information contained in this data element (i.e., data element 522(2)).

Input module 508 can, upon receiving indications from workflow module (e.g., from workflow communicator), attempt to access any data elements that are indicated (e.g., by the received indications) as being missing. In some embodiments, input module 508 can execute one or more error handlers, such as based on the received indication. These error handlers can be generated and/or modified (e.g., by input module 508) independently from workflow 504. For example, the error handlers can be modified to obtain data elements from various data sources. In some embodiments, input module 508 can prompt a user with questions related to missing data elements (e.g., inaccessible elements). For example, if an operation failed to obtain element 522(2) (such as because that data element was corrupt, deleted, or otherwise inaccessible), then input module 508 can prompt a user (e.g., using a prompt that is displayed on user's screen, such as by using a GUI) for this data element. In another example, input module 508 can generate an email (or some other form of communication) that can be sent to a user. Input module 508 can then wait to receive this information, and upon receipt of this information, send the information back to workflow module 502.

In some embodiments, during execution of workflow 504 (e.g., by using workflow engine 510), workflow communicator 512 can generate a message that can be displayed to a user (e.g., by using input module 508). This message can indicate that, for example, a current task(s) and/or operation(s) that are being executed. In one implementation, a user can view output of this message (e.g., on a display). In another implementation, another application can access this message to detect the current task(s) and/or operation(s) that are being executed. Workflow engine 510 can communicate the state of the task(s)/operation(s) being executed to workflow communicator 512. Workflow communicator 512 can then update the message with the current status, e.g., characteristics related to execution of the workflow. In some embodiments, generating and/or modifying (e.g., to update the task(s)/operation(s) being executed) of this message can be performed using one thread, while task(s) are executed (e.g., using workflow engine) using another one or more thread(s). If a task successfully completes, then workflow engine 510 can communicate with workflow communicator 512 to indicate the successfully executed task.

When a task fails, workflow engine 510 can communicate with workflow communicator 512 to indicate this failure. This indication can identify the task(s) and/or operation(s) that have failed. For example, if a task successfully completes, this indication can indicate task success; and upon task failure, this indication can include one or more questions that can be prompted to the user. Upon task failure, the question(s) can be generated by the error handler(s) of the task that has failed. Upon task failure, in some embodiments, instead of, or in addition to, this question, the indication can include function call(s) and/or code to be executed. This function call/code can also be generated by the error handler(s) of the task. The function call(s)/code can indicate, for example, another error handler to be executed by input module 508.

Input module 508 then can return indication(s) to workflow module. These return indications, which can contain, for example, the missing element(s) (i.e., that the failed task could not obtain), can then be used, such as by workflow engine 510, when re-executing the failed task. However, if the return indications indicate further failure, e.g., the missing element(s) could not be obtained either from a user and/or by accessing additional data sources, among others, workflow engine 510 can determine that the failed task can be skipped, i.e., not re-executed. In addition, if workflow 504 includes a task (such as task D of FIG. 6) that is executed only upon this further failure (e.g., total failure), that task can be executed next, as according to control flow principles.

FIG. 6 is a block diagram 600 of an example user interface (UI) 602 that displays a workflow, according to some embodiments. UI 602, such as a graphical user interface (GUI) 602, can be generated by visual workflow software, which can also be used to generate and/or execute a workflow. GUI 602 can display various graphical elements that represent elements of workflow 604. In the example workflow 604, GUI 602 displays graphical element of icons 606(1)-606(4) and connectors 608(1)-608(4), although use of additional and/or different graphical elements is contemplated. For example, various graphical elements showing various control flow operations can be used, such as that indicate logical operations of AND, OR, IF, among others. In some embodiments, various tasks can be performed in parallel, as desired. GUI 602 can be displayed using a display, such as by using an input module.

Each icon 606(1)-606(4) can represent a corresponding one of tasks 610(1)-610(4), respectively. For example, icon 606(1) represents task A, where task A represents one or more operations. Furthermore, various different types of icons can be used to indicate different types of tasks that are represented by each such icon. Thus, these icons illustrate that tasks can be represented using GUI 602, but include stored as textual commands (e.g., code). In some embodiments, each of tasks 610(1)-610(4) can represent one or more of tasks 516(1)-516(N). For example, a workflow module, when executing workflow 604 (that includes task A 610(1) that represents task 516(1)), would execute operations of task 516(1) when processing task A 610(1). In this example workflow 604, according to control flow principles, task A is executed first, followed by task B. Connectors 608(1)-608(3) can indicate direction of control flow from one task to another. For example, connector 608(1) indicates control flow from task A to task B. Next, task C can be executed upon successful execution of Task B. Otherwise, task D is executed upon total failure of execution of Task B. As noted, additional control flow (and/or data flow) graphical elements can be used to indicate additional operations.

Workflow designers can generate workflows that perform various operations. A workflow designer can generate a workflow in a variety of different ways. For example, a consumer can create a workflow by textually programming each task and any control flow relationships between these tasks. Workflow designer can generate the workflow using workflow designed software, such as by programming using a visual programming language. The workflow designer software can include a stand-alone visual programming application, or can include web interfaces (e.g., that interface with visual programming application(s)). A workflow designer can access such web interface via a web browser in order to generate workflows.

Figure 7:
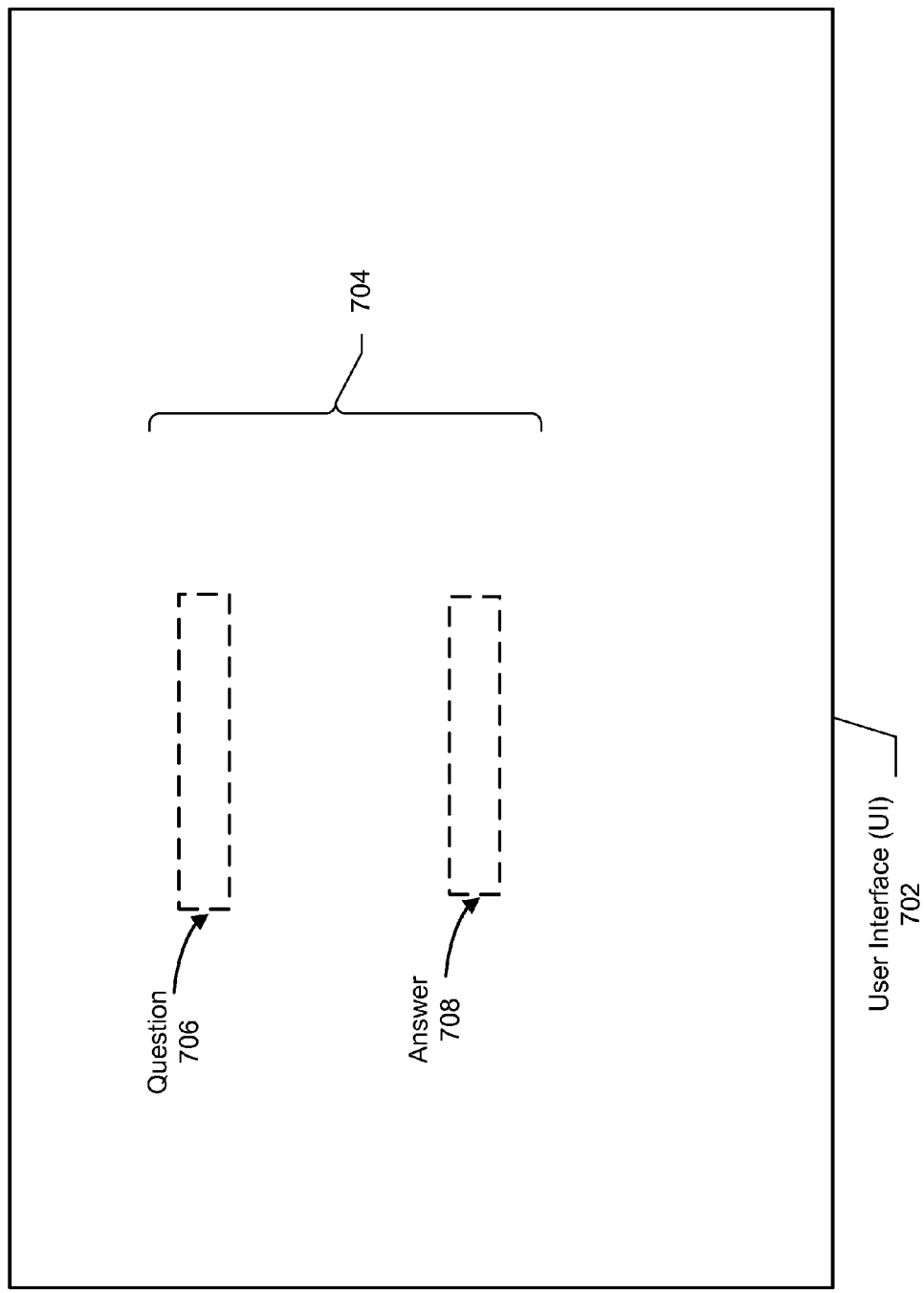
FIG. 7 illustrates an example user interface for receiving user input when performing automated error recovery in workflow processes, according to some embodiments.

FIG. 7 is a block diagram 700 that illustrates an example graphical user interface (UI) 702 that can be used to interact with a user, according to some embodiments. UI 702, such as a graphical UI 702, can be displayed using a display, such as by using an input module. GUI 702 can display various visual elements 704, including one or more questions 706 and one or more corresponding answer(s) 708. As described above, GUI 702 can be displayed (e.g., on a display) by an input module. The input module can display question 706 according to received indication(s). In one embodiment, the received indication can include, for example, the text of question 706. In another embodiment, the input module can generate the text of question 706 based on the received indication. The input module can receive answer 708, such as via user input. The input module can then communicate a portion or all of answer 708 back to the workflow module.

Figure 8:
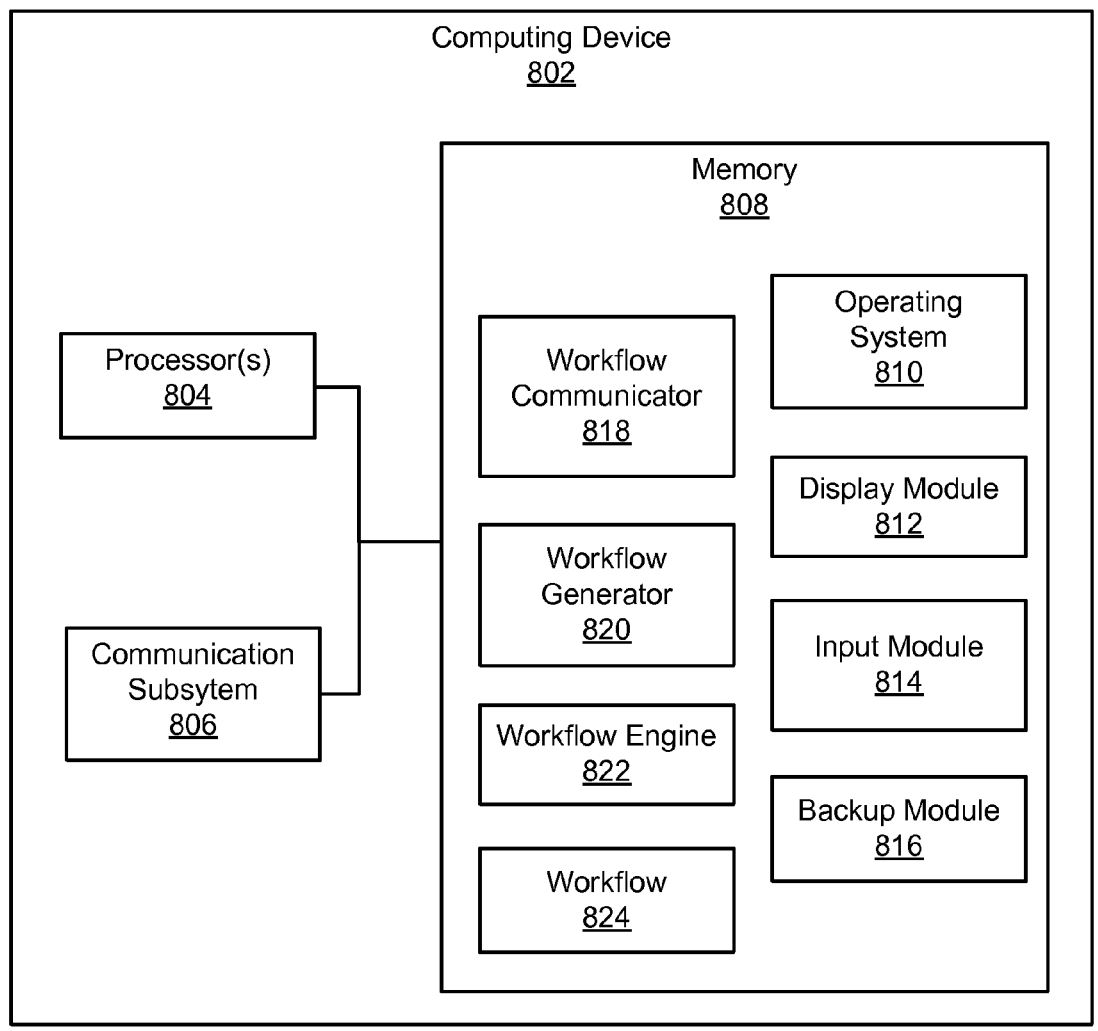
FIG. 8 is a block diagram illustrating various components of a computing device, according to some embodiments.

FIG. 8 is a block diagram 800 of a computing device 802, such computing devices 102(1)-102(2), according to some embodiments. Computing device 802 includes a processor 804, communication subsystem 806, and a memory 808. Memory 808 includes an operating system 810, a display module 812, an input module 814, a backup module 816, a workflow communicator 818, a workflow generator 820, and workflow engine 822, and workflow 824. It is noted that is some embodiments, one or more of these elements may be combined. It is also noted that one or more of modules 810-824 may be implemented as a software and/or hardware module. It is also noted that in some embodiments one or more of elements of computing device 802 may not be used. Processor(s) 804 can execute one or more of modules 810-824. One or more of modules 810-822 can implement at least portions of methods 200, 300, and/or 400.

In one implementation, workflow communicator 818 can implement workflow communicator 512 of FIG. 5. In one implementation, workflow generator 820 can be used to generate workflows. For example, with reference to FIG. 1, input module 112 can communicate with workflow module 108(2) (e.g., directly and/or by using workflow module 108(1)) to generate workflow 110, where workflow module 108(2) includes such a workflow generator. In one implementation, workflow engine 822 can implement workflow engine 510. In one implementation, input module 814 can implement input module 508 and/or input module 112. In one implementation, workflow 824 can implement workflow 504 and/or 110. In some embodiments, workflow communicator 818, workflow generator 820, and/or workflow engine can implement a workflow module, such as workflow module 108(1), workflow module 108(2), and/or workflow module 502. In one embodiment, modules 810-824 can operate as described with reference to FIG. 5.

Figure 9:
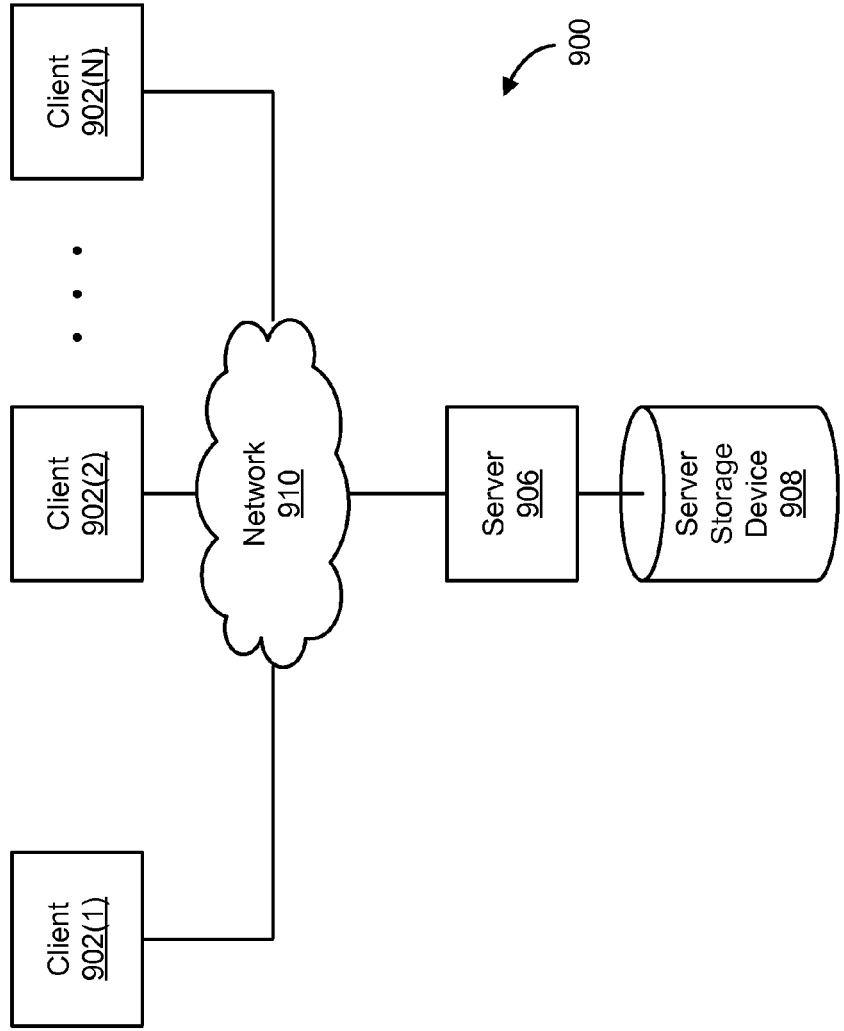
FIG. 9 is a block diagram illustrating a network architecture in which embodiments of the present application can be implemented.

Elements of network architecture can be implemented using different computer systems and networks. An example of one such network environment is described below with reference to FIG. 9. FIG. 9 is a simplified block diagram illustrating a network architecture 900 in which one or more clients are provided with access to a server via various network connections. As depicted in FIG. 9, clients 902(1)-(N) are coupled to a network 910, and so are able to access a server 906 (which can be used to implement computing device(s) of FIG. 1) via network 910. Other servers (not shown) can be used instead to implement computing devices, server(s), and/or node(s). A client can be implemented using, for example, a desktop computer, a laptop computer, a workstation, a server, a cell phone, a smart phone, a network-enabled personal digital assistant (PDA), or the like. An example of network 910, which can be used by clients 902(1)-(N) to access server 906, is the Internet. Alternatively, access to server 906 can be provided by a local area network (LAN) utilizing Ethernet, IEEE 802.11x, or some other communications protocol. As will be appreciated, server 906 can be accessed by clients coupled directly thereto (not shown).

As also depicted on FIG. 9, server 906 is coupled to a server storage device 908, which includes a data volume such as storage device(s) 104(1)-104(N), among others. Server storage device 908 can be implemented as a single storage device or a collection of storage devices. Server storage device 908 can also be implemented as a storage area network, which couples remote storage devices to a server (e.g., server 906), such that the remote storage devices appear as locally-attached storage devices to the server's OS, for example.

In light of the present disclosure, those of skill in the art will appreciate that server storage device 908 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 900 can include other components such as routers, firewalls and the like that are not germane to the discussion of the present network and will not be discussed further herein. Those of skill in the art will also appreciate that other configurations are possible. For example, clients 902(1)-(N) can be directly coupled to server storage device 908 without the user of a server or Internet; server 906 can be used to implement both the clients and the server; network architecture 900 can be implemented without the use of clients 902(1)-(N); and so on. As an example implementation of network architecture 900, server 906, services requests to data generated by clients 902(1)-(N) to data stored in server storage device 908.

Figure 10:
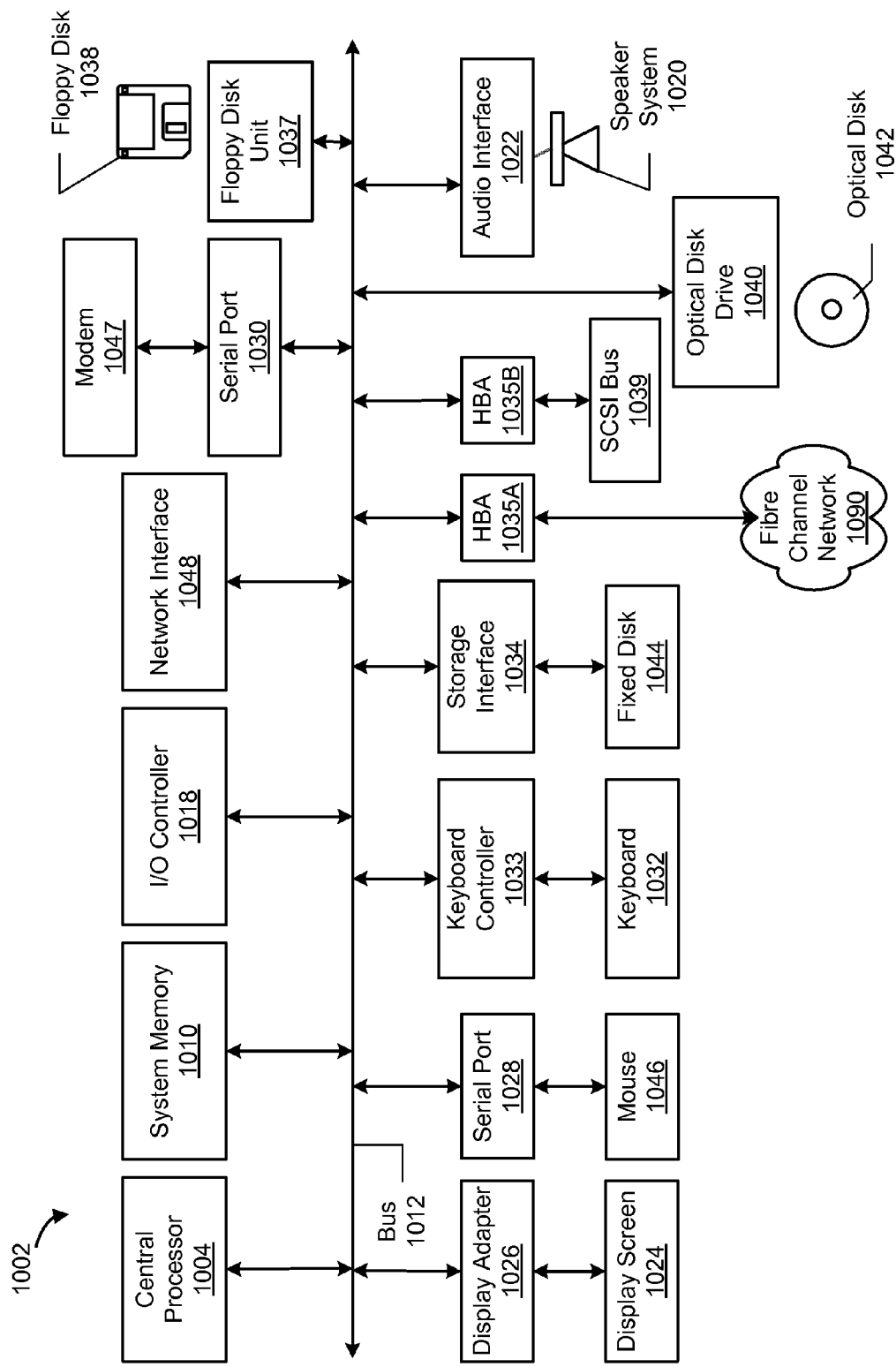
FIG. 10 is a block diagram that illustrates an example of a computer system suitable for implementing embodiments of the present application.

FIG. 10 depicts a block diagram of a computer system 1002 suitable for implementing the present disclosure. Computer system 1002 may be illustrative of various computer systems in the networked system of FIG. 1, such as computer device(s), among others. Computer system 1002 includes a bus 1012 which interconnects major subsystems of computer system 1002, such as a central processor 1004, a system memory 1010 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1010, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1002 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1002, can connect to a standard computer readable medium for storage and/or retrieval of information, such as a fixed disk drive 1044. Fixed disk drive 1044 may be a part of computer system 1002 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code for performing automated error recovery when executing workflows (such as described above with reference to the methods of FIGS. 2-4, as well as with reference to FIG. 5), etc., to implement the present disclosure can be stored in computer-readable storage media such as one or more of system memory 1010, fixed disk 1044, optical disk 1042, or floppy disk 1038. Memory 1020 is also used for storing temporary variables or other intermediate information during the execution of instructions by the processor 1004. The operating system provided on computer system 1002 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   executing, using one or more processors, one or more first operations of a first task,
   wherein
   a workflow comprises a plurality of tasks,
   the plurality of tasks comprises the first task,
   each task of the plurality of tasks comprises
   one or more operations, and
   a respective error recovery portion corresponding to the each task, and
   the one or more first operations are configured to access one or more elements;
   detecting an error in execution of the first task, wherein
   the detecting is performed by the first task, and
   the error results from a failure of a failed operation of the one or more operations;
   in response to a detection of the error
   generating an error indication, wherein
   the generating the error indication comprises determining which operation of the one or more operations is the failed operation, and
   the error indication identifies the failed operation, and
   automatically executing an error recovery portion of the first task, wherein
   the automatically executing the error recovery portion comprises
   communicating the error indication to an input module,
   prompting a user with one or more questions related to one or more inaccessible elements of the one or more elements,
   determining whether a response from the input module is received within a specified amount of time,
   receiving the response from the input module in response to the communicating, wherein
   the response comprises information identifying a computing device,
   determining, based on the response, whether to re-execute the first task, and
   generating an indication of re-execution in response to the determining, and
   the automatically executing the error recovery portion is performed by the first task and is configured to resolve the error independently of any workflow code external to the first task.

2. The method of claim 1, wherein
the error indication includes information that identifies the one or more inaccessible elements.

3. The method of claim 2, wherein
the one or more inaccessible elements are not specified by the workflow.

4. The method of claim 1, wherein
the workflow does not indicate presence of the error recovery portion.

5. The method of claim 1, wherein
the workflow is generated using a workflow design language as a workflow program, and
the workflow program does not comprise any elements directed to the error recovery portion.

6. The method of claim 1, wherein
the automatically executing the error recovery portion comprises:
   performing, based on the response, one or more error handlers.

7. The method of claim 1, further comprising:
in response to automatic execution of the error recovery portion, executing the first task using data from the execution of the error recovery portion.

8. The method of claim 1, further comprising:
executing a messaging service, wherein
the messaging service is configured to communicate with the input module; and
executing a workflow service, wherein
the workflow service is configured to execute the workflow, and
the execution of the workflow comprises the executing of the one or more first operations.

9. The method of claim 8, wherein
the messaging service is configured to indicate one or more characteristics related to execution of the workflow.

10. The method of claim 8, wherein
the automatically executing the error recovery portion comprises
the workflow service communicating one or more error indications with the messaging service, wherein
the one or more error indications indicate the one or more inaccessible elements, and
the messaging service is configured to receive the response.

11. The method of claim 1, further comprising:
concurrently executing a second task of the plurality of tasks in parallel with the first task, wherein
the first task is executing using a first thread, and
the second task is executed using a second thread.

12. A system comprising:
one or more processors;
a workflow, wherein
the workflow comprises a plurality of tasks,
the plurality of tasks comprises a first task,
each task of the plurality of tasks comprises one or more operations, and a respective error recovery portion corresponding to the each task, and
one or more first operations of the first task are configured to access one or more elements;
a workflow module, configured to be executed using the one or more processors, wherein
the workflow module is configured to
execute the workflow including the first task,
detect an error in execution of the first task, wherein
detecting the error is performed by the first task, and
the error results from a failure of a failed operation of the one or more operations, and
in response to a detection of the error
generate an error indication, wherein
generating the error indication comprises determining which operation of the one or more operations is the failed operation, and
the error indication identifies the failed operation, and
automatically execute an error recovery portion of the first task, wherein
automatically executing the error recovery portion comprises
communicating the error indication to an input module,
prompting a user with one or more questions related to one or more inaccessible elements of the one or more elements,
determining whether a response from the input module is received within a specified amount of time,
receiving the response from the input module in response to the communicating, wherein
the response comprises information identifying a computing device,
determining, based on the response, whether to re-execute the first task, and
generating an indication of re-execution in response to the determining, and
the automatically executing the error recovery portion is performed by the first task and is configured to resolve the error independently of any workflow code external to the first task.

13. The system of claim 12, wherein
the error indication includes information that identifies the one or more inaccessible elements.

14. The system of claim 12, wherein
the one or more inaccessible elements of the one or more elements are not specified by the workflow.

15. The system of claim 12, wherein
the workflow does not indicate presence of the error recovery portion.

16. The system of claim 12, wherein
the workflow module is further configured to
perform, based on the response, one or more error handlers.

17. A computer program product comprising a plurality of instructions executable on a computer system to:
execute one or more first operations of a first task, wherein
a workflow comprises a plurality of tasks,
the plurality of tasks comprises the first task,
each task of the plurality of tasks comprises one or more operations, and a respective error recovery portion corresponding to the each task, and
the one or more first operations are configured to access one or more elements,
detect an error in execution of the first task,
wherein
detecting the error is performed by the first task, and
the error results from a failure of a failed operation of the one or more operations, and
in response to a detection of the error
generate an error indication, wherein
generating the error indication comprises determining which operation of the one or more operations is the failed operation, and
the error indication identifies the failed operation, and
automatically execute an error recovery portion of the first task, wherein automatically executing the error recovery portion comprises
communicating the error indication to an input module,
prompting a user with one or more questions related to one or more inaccessible elements of the one or more elements,
determining whether a response from the input module is received within a specified amount of time,
receiving the response from the input module in response to the communicating, wherein
the response comprises information identifying a computing device,
determining, based on the response, whether to re-execute the first task, and
generating an indication of re-execution in response to the determining, and
the automatically executing the error recovery portion is performed by the first task and is configured to resolve the error independently of any workflow code external to the first task; and
a non-transitory computer-readable storage medium, wherein the instructions are encoded in the computer-readable storage medium.

18. The computer program product of claim 17, wherein the error indication includes information that identifies the one or more inaccessible elements.

19. The computer program product of claim 17, wherein the one or more inaccessible elements of the one or more elements are not specified by the workflow.

20. The computer program product of claim 17, wherein the workflow does not indicate presence of the error recovery portion.

* * * * *